United States Patent
Schmitt et al.

(10) Patent No.: US 10,011,225 B2
(45) Date of Patent: Jul. 3, 2018

(54) SYSTEM AND METHOD FOR DETECTING AT LEAST ONE REPLACEMENT COMPONENT OF A DEVICE

(71) Applicant: Robert Bosch GmbH, Stuttgart (DE)

(72) Inventors: Michael Schmitt, Stuttgart (DE); Peter Schmitt, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/374,417

(22) Filed: Dec. 9, 2016

(65) Prior Publication Data

US 2017/0174126 A1  Jun. 22, 2017

(30) Foreign Application Priority Data

Dec. 21, 2015 (DE) .......................... 10 2015 226 164

(51) Int. Cl.
| | | |
|---|---|---|
| *G07C 9/00* | (2006.01) | |
| *B60Q 9/00* | (2006.01) | |
| *G07C 5/08* | (2006.01) | |
| *G06Q 10/00* | (2012.01) | |

(52) U.S. Cl.
CPC ............... *B60Q 9/00* (2013.01); *G06Q 10/20* (2013.01); *G07C 5/08* (2013.01)

(58) Field of Classification Search
CPC ........ G07C 5/00; G07C 5/08; G07C 9/00111; G07C 9/309; G07C 2009/00531; G01V 8/12; G05B 19/4183; G05B 19/0428; B60L 11/1846

USPC ... 340/438, 572.1, 426.1, 540, 10.42, 636.1, 340/5.61, 5.8
See application file for complete search history.

(56) References Cited

U.S. PATENT DOCUMENTS

| | | | | |
|---|---|---|---|---|
| 6,944,516 | B1 * | 9/2005 | Collins | G05B 19/4183 29/712 |
| 7,400,268 | B2 * | 7/2008 | Wilbrink | G07C 5/085 340/438 |
| 9,685,013 | B2 * | 6/2017 | Nair | B60R 25/04 |
| 2003/0041098 | A1 * | 2/2003 | Lortz | G06Q 10/06 709/203 |
| 2003/0193398 | A1 * | 10/2003 | Geber | B60R 25/00 340/568.1 |
| 2005/0035852 | A1 * | 2/2005 | Paulsen | G07C 5/085 340/438 |
| 2007/0252675 | A1 * | 11/2007 | Lamar | B25F 5/00 340/5.64 |

(Continued)

FOREIGN PATENT DOCUMENTS

DE 10256260 A1 6/2004

*Primary Examiner* — Firmin Backer
*Assistant Examiner* — Munear Akki
(74) *Attorney, Agent, or Firm* — Norton Rose Fulbright US LLP; Gerard Messina (57) ABSTRACT

A system and a method for detecting a replacement component of a device. The method includes detecting a first identifier of a device which includes at least one replaceable component, using a mobile terminal; detecting a second identifier of at least one replacement component, using the mobile terminal; transmitting the detected first and second identifiers to a computing device; generating a control signal based on the first and second identifiers; transmitting the generated control signal to the device; and controlling the device with the aid of the control signal.

17 Claims, 4 Drawing Sheets

(56) References Cited

U.S. PATENT DOCUMENTS

| | | | |
|---|---|---|---|
| 2009/0153311 A1* | 6/2009 | Lee | B60R 25/2018 340/426.1 |
| 2012/0050054 A1* | 3/2012 | Fujiwara | B60L 11/1846 340/636.1 |
| 2012/0062725 A1* | 3/2012 | Wampler, II | G01V 8/12 348/86 |
| 2012/0167721 A1* | 7/2012 | Fluhrer | B25B 21/00 81/54 |
| 2014/0365335 A1* | 12/2014 | Tyshuk | G06Q 30/0623 705/26.61 |
| 2015/0116081 A1* | 4/2015 | Nair | B60R 25/04 340/5.61 |
| 2015/0162646 A1* | 6/2015 | Kawase | H01M 2/1022 429/7 |
| 2015/0178524 A1* | 6/2015 | Kwon | G01R 31/007 340/10.42 |
| 2016/0189115 A1* | 6/2016 | Cattone | G06Q 10/20 705/26.8 |
| 2016/0290270 A1* | 10/2016 | Sato | F02N 11/0825 |

\* cited by examiner

SYSTEM AND METHOD FOR DETECTING AT LEAST ONE REPLACEMENT COMPONENT OF A DEVICE

CROSS REFERENCE

The present application claims the benefit under 35 U.S.C. § 119 of German Patent Application No. DE 102015226164.6 filed on Dec. 21, 2015, which is expressly incorporated herein by reference in its entirety.

FIELD

The present invention relates to a system and a method for detecting at least one replacement component of a device.

BACKGROUND INFORMATION

In a number of market situations, exchange or replacement components for a product are manufactured and marketed by numerous suppliers. Replacement components that are manufactured by certain manufacturers may be manufactured with higher tolerances, may fail to meet predetermined requirements, for example regulatory requirements, or may have no, or inferior, functionality. When such a replacement component is installed in an original product, this may result in a reduction in performance or functionality, or even damage to the original product or subsequent damages.

A method and a device for verifying a product are described in German Patent No. DE 10 256 260 A1.

SUMMARY

The present invention provides a system for detecting at least one replacement component of a device. The system includes a computing device; a device which includes at least one replaceable component; a first identification means which provides a first identifier for the device being mounted on the device; a mobile terminal, with the aid of which the first identification means for detecting the first identifier is readable, and with the aid of which a second identification means for detecting a second identifier is readable; the second identification means being mounted on a replacement component for the device which is suitable for replacing the replaceable component in the device; the mobile terminal being designed for transmitting the detected first and second identifiers to the computing device; and the computing device being designed for generating a control signal based on the first and second identifiers, and for transmitting the control signal to the device in order to control the device.

The device may, for example, be a complex machine which includes a plurality of replaceable components, in particular parts subject to wear. The device may be a vehicle, for example, which includes replaceable components such as a filter.

The identification means may involve any arbitrary technical approach with the aid of which an identifier is providable. The identification means may be a graphical code, for example, such as a barcode or a QR code, an RFID transmitter, a numerical combination, or the like. An identifier may in particular be a data record or character string, for example a numerical sequence, which identifies, in particular unambiguously, the device or the replacement component. The first identifier may also be referred to as a device identifier. The second identifier, or the second identifiers for multiple replacement components, may also be referred to as a component identifier or component identifiers.

The identification means may be an integral part of the device or the replacement component, such as an engraved graphical code. Alternatively or additionally, the identification means may be mounted separately on the device or the replacement component, for example using an adhesive label which includes a graphical code or an RFID transmitter.

The mobile terminal may be a smart phone or a tablet, for example, on which an app or a program runs which at least partially controls or implements the functions according to the present invention of the mobile terminal. The mobile terminal may include an optical sensor, for example, such as a camera, with the aid of which an optically readable identification means such as a barcode or a QR code is detectable and interpretable for reading out or detecting the first identifier and the second identifier. During the detection of the identifier based on the particular identification means, a decryption algorithm stored in the app of the mobile terminal may be used, without which the particular identifier cannot be obtained from the particular identification means in question.

The computing device may in particular be a central server which communicates with the mobile terminal and/or with the device in a wired and/or wireless manner, in particular using the Internet.

Moreover, a method for detecting a replacement component of a device is provided which includes the following steps: detecting a first identifier of a device which includes at least one replaceable component, using a mobile terminal; detecting a second identifier of a replacement component for the replaceable component of the device, using a mobile terminal; transmitting the detected first and second identifiers to a computing device; generating a control signal based on the first and second identifiers; transmitting the generated control signal to the device; and controlling the device with the aid of the control signal.

The present invention may also the replaceable components that are present on the device to be documented over the service life of the device, their authenticity and/or their meeting of requirements concerning the device to be monitored, and possible malfunctions of the device to be recognized early, before or after they occur. The requirements may involve, for example, technical or regulatory standards or compliance with regulatory prohibitions. Such a prohibition may stipulate, for example, that certain products may not be used, installed, etc., within certain territorial, for example national, borders, and/or by unauthorized persons.

The first and second identifiers transmitted to the computing device may be used for entry, with the aid of the computing device, into a database of the computing device, where complete documentation of all replacement components used for the particular device may thus be created. The particular device is identified by its individual, unique first identifier.

Advantageous specific embodiments and refinements result from the description herein, with reference to the figures.

According to one preferred refinement, the computing device is designed for generating the control signal in such a way that the device is activated or deactivated by the control signal. A deactivation of the device is understood in particular to mean that the device does not carry out at least one function, for which it is provided, before the device has been reactivated. For example, the deactivation may include an interruption of a power supply of the device. An activation of the device is understood to mean the reverse process, i.e., that the device in particular is once again enabled to fulfill its proper function.

If the device is a vehicle, the deactivation may include, for example, that an ignition of the vehicle is not actuatable, and/or that an engine of the vehicle cannot be switched on as long as the vehicle is deactivated. Alternatively, it may also be provided that when the vehicle is deactivated, although the vehicle is startable and drivable, one or multiple functions of the vehicle is/are switched off and/or cannot be carried out by the driver of the vehicle. The occurrence of undesirable effects or damage to the device due to installation of an unsuitable replacement component may thus be prevented.

According to another preferred refinement, the computing device includes an interface via which the computing device may access an external database. The computing device may be designed for checking whether the external database contains entries in conjunction with the first and/or the second identifier(s), and if so, which entries. The computing device may also be designed for generating the control signal additionally based on the entries in the external database. The reliability and/or authenticity of the replacement component may thus be checked even more soundly.

For example, the computing device may access an external database of an original product manufacturer with the aid of the interface in order to check whether a certain transmitted second identifier corresponds to a product that is manufactured by the original product manufacturer. If this is the case, and it is known that the product in question meets predetermined requirements for the replacement component, the computing device may adapt the control signal on this basis. For example, the control signal may be designed for deactivating the device or the replacement component if the product corresponding to the second identifier does not meet the predetermined requirements. Additionally or alternatively, however, the control signal may be designed for controlling the device to output a warning signal which indicates that the replacement component is a replacement component which does not meet certain standards. For example, an indicator light of a vehicle may be switched on by the control signal.

According to another preferred refinement, the mobile terminal includes a detection device for detecting additional parameters. The mobile terminal may be designed, and/or controlled by an app of the mobile terminal, to transmit the additional parameters to the computing device. The transmission of the additional parameters may take place in addition to, or based solely on, an appropriate additional parameter query by the computing device. For example, a spatial, temporal, and/or regulatory situation in which the installation of the replacement component takes place or has taken place is ascertainable more accurately with the aid of the additional parameters. It may thus be ascertained, estimated, or plausibility-checked even more precisely whether or not the installed replacement component meets the predetermined requirements for the replacement component.

According to another preferred refinement, the additional parameters may include an instantaneous position of the mobile terminal. For this purpose, the detection device may be based, for example, on the GPS system, the Galileo system, or the Glonass system in order to ascertain the instantaneous position of the mobile terminal. Alternatively or additionally, the additional parameters may include an instantaneous time and/or a third identifier. The third identifier may indicate the mobile terminal and/or a present user of the mobile terminal. The third identifier may be, for example, a serial number of the app running on the mobile terminal, a serial number of the mobile terminal, a user name, and/or a user account name of a user of the mobile terminal.

According to another preferred refinement, the device is designed as a vehicle. In particular in vehicles, a plurality of replaceable components is generally present which must meet numerous requirements.

According to another preferred refinement, the device includes a testing device which is designed for ascertaining at least one replacement indication for an occurred replacement of the replaceable component of the device, generating an indication signal based on the at least one detected replacement indication, and transmitting the generated indication signal to the computing device. A replacement indication is understood in particular to mean any indication which indicates a removal or replacement of the replaceable component of the device and/or an installation of a replacement component, in particular an installation of a replacement component which does not meet the predetermined requirements for replacement components.

According to one preferred refinement, the method according to the present invention includes the following steps: ascertaining a replacement indication for an occurred replacement of the replaceable component of the device; generating an indication signal based on the ascertained replacement indication; and transmitting the generated indication signal to the computing device. Based on the indication signal, in particular the generated control signal may be adapted, for example to control the device, preferably the installed replacement component of the device, in such a way that a malfunction in the operating state is avoided, and/or that the device or the installed replacement component is deactivated.

BRIEF DESCRIPTION OF THE DRAWINGS

The present invention is explained in greater detail below with reference to the exemplary embodiments illustrated in the schematic figures.

DETAILED DESCRIPTION OF EXAMPLE EMBODIMENTS

Unless stated otherwise, identical or functionally equivalent elements and devices are provided with the same reference numerals. The numbering of method steps is used for clarity, and unless stated otherwise, in particular is not intended to imply a specific chronological sequence. In particular, multiple method steps may also be carried out simultaneously.

Figure 1:
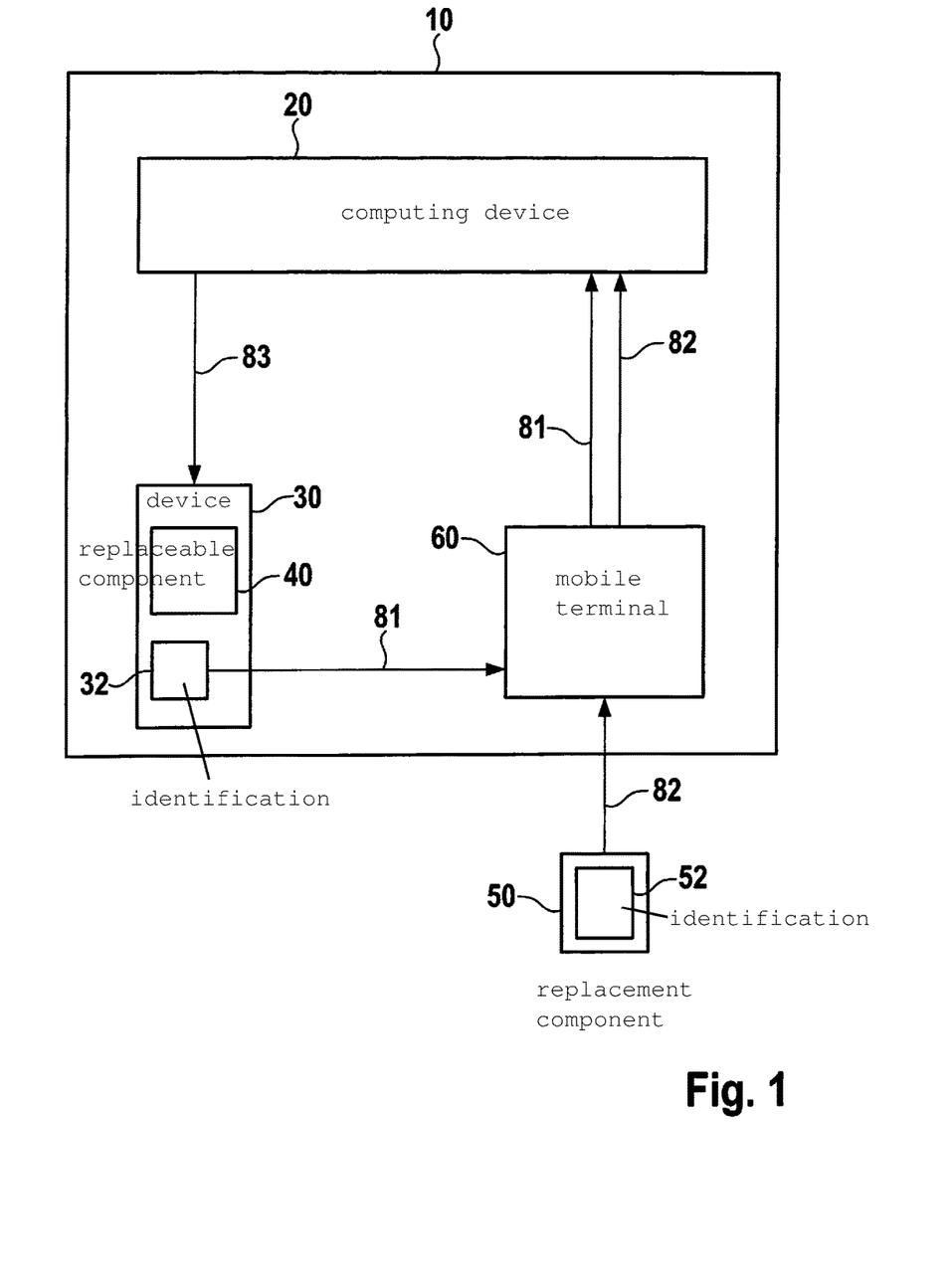
FIG. 1 shows a schematic block diagram for explaining a system for detecting at least one replacement component of a device according to one specific embodiment of the present invention.

FIG. 1 shows a schematic block diagram for explaining a system 10 for detecting at least one replacement component 50 of a device 30 according to one specific embodiment of the present invention.

System 10 includes a device 30 with at least one replaceable component 40. In particular, device 30 may be a vehicle, and replaceable component 40 may be a filter, for example in the low pressure circuit of a diesel engine of the vehicle. A first identification means 32, for example a QR code, a barcode, or the like is mounted on device 30. First identification means 32 may in particular be mounted at a location of device 30 which generally is not replaced or removed from device 30 or which plays a key role for device 30.

System 10 also includes a mobile terminal 60, with the aid of which first identification means 32 for detecting a first identifier 81 for device 30 is readable, and with the aid of which a second identification means 52 for detecting a second identifier 82 for replacement component 50 is readable. Second identification means 52 may, for example, have a design of the same type as first identification means 32, but with different contents.

Second identification means 52 may in particular be mounted on a replacement component 50 which is designed for replacing replaceable component 40 of device 30. In the above example, replacement component 50 may thus likewise be a filter. Mobile terminal 60 is designed for transmitting detected first and second identifiers 81, 82 to a computing device 20 of system 10.

Computing device 20 may in particular be a server which is connected to the Internet and which may enter into communication with mobile terminal 60 and/or with device 30 via the Internet. Computing device 20 is designed for generating a control signal 83 based on first and second identifiers 81, 82, and for transmitting the control signal to device 30 in order to control device 30. Control signal 83 may, for example, effectuate an activation or deactivation of device 30 and/or of installed replacement component 50, and/or an output of an indication signal.

Figure 2:
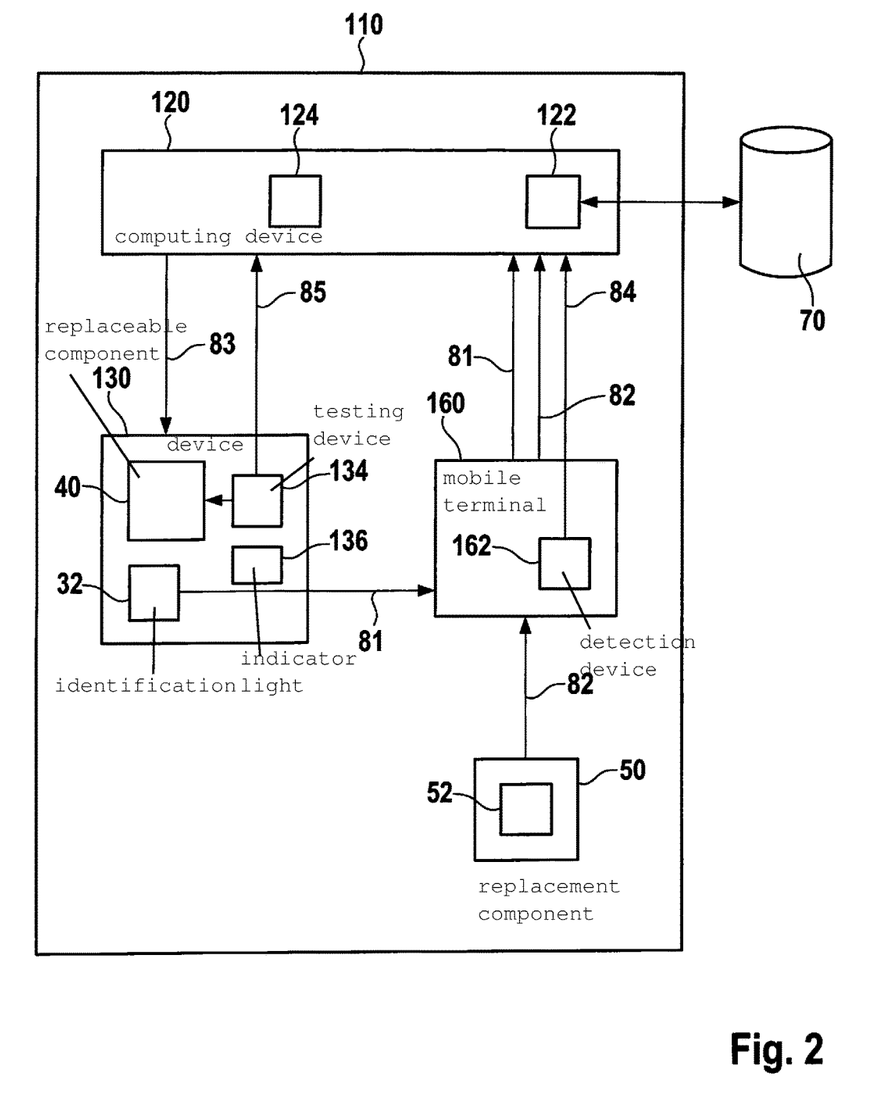
FIG. 2 shows a schematic block diagram of a system for detecting at least one replacement component of a device according to another specific embodiment of the present invention.

FIG. 2 shows a schematic block diagram of a system 110 for detecting at least one replacement component 50 of a device 130 according to another specific embodiment of the present invention. System 110 is a variant of system 10, and is adaptable according to all variants and refinements described with regard to system 10, and vice versa. Unless explicitly described otherwise, system 110 includes all elements of system 10.

System 110 includes a computing device 120 instead of or in addition to computing device 20 of system 10, computing device 120 being designed for generating control signal 83 in such a way that device 130 is activated or deactivated by control signal 83. Alternatively or additionally, control signal 83 may be designed for activating or deactivating an indicator light 136 of device 130. Computing device 120 may in particular be designed for determining, based on first and second identifiers 81, 82, whether or not a replacement component 50 associated with second identifier 82 meets predetermined requirements stored in computing device 120 when used with device 130 which is indicated by first identifier 81. It may be provided that computing device 120 generates control signal 83 in such a way that if this is not the case, control signal 83 deactivates device 30 and/or activates indicator light 136 of device 30 in order to generate control signal 83 in such a way that control signal 83 activates device 30 and/or deactivates indicator light 136 if this is the case.

For this purpose, computing device 120 includes an interface 122 via which computing device 120 may access an external database 70, for example via the Internet. External database 70 may be, for example, a database of a product manufacturer of replacement component 50. Computing device 120 may be designed for checking whether external database 70 contains entries in conjunction with first and/or the second identifier(s) 81, 82, and if so, which entries.

For example, it may be ascertained whether or not external database 70 indicates that replacement component 50, which is indicated by second identifier 82, is suitable for use with device 130, which is indicated by first identifier 81, in such a way that the predetermined requirements are met. It may also be ascertained whether or not replacement component 50 indicated by second identifier 82 has even been manufactured by the product manufacturer associated with external database 70. Computing device 120 may be designed for generating control signal 83 additionally based on the entries in external database 70.

When it is stated below that a property of replacement component 50 is to be checked, this is always understood to mean that this takes place based on second identifier 82, which indicates replacement component 50. Likewise, when it is stated below that certain parameters or properties of device 30 are checked, this is understood in particular to mean that this takes place with regard to device 30, which is indicated by first identifier 81.

A mobile terminal 160 of system 110, which replaces or supplements mobile terminal 60 of system 10, includes a detection device 162 for detecting additional parameters 84, mobile terminal 160 being designed for transmitting additional parameters 84 to computing device 120, for example via a mobile communications network and/or the Internet. Additional parameters 84 may include an instantaneous position of mobile terminal 60, an instantaneous time, and/or a third identifier. The third identifier may indicate mobile terminal 160 and/or a present user of mobile terminal 160.

Thus, computing device 120 may include, for example, a database 124 with entries in the following form for each device 130: place of manufacture, time stamp for a replacement event, first identifier of device 130, second identifier of a replacement component, and optionally further second identifiers of additional replacement components.

Device 130 of system 110, which replaces or supplements device 30 of system 10, includes a testing device 134 which is designed for ascertaining at least one replacement indication, for example for an occurred replacement of replaceable component 40 of device 130, for generating an indication signal 85 based on the at least one detected replacement indication, and for transmitting generated indication signal 85 to computing device 120. In particular, as described above, control signal 83 may be adapted based on indication signal 85, for example to activate or deactivate an indicator light 136 of device 30 in order to deactivate or activate device 130 or replacement component 50.

Testing device 134 may include a nonvolatile data memory, for example an electrically erasable programmable read-only memory (EEPROM). The at least one detected replacement indication and/or generated indication signal 85 is bufferable with the aid of the data memory. It may be provided that the at least one detected replacement indication and/or generated indication signal 85 are/is buffered in the data memory until a communication connection between device 130, in particular testing device 134, and computing device 120 is established.

The communication connection may be established, for example, via mobile terminal 160 and/or via a communication interface of device 130, in particular testing device 134. Alternatively or additionally, it may be provided that the at least one detected replacement indication is buffered in the data memory until testing device 134 has determined the existence or nonexistence of plausibility of the at least one detected replacement indication (in particular in combination with all detected replacement indications), indication signal 85 being generated and/or transmitted to computing device 120 only if the existence of plausibility has been determined by testing device 134.

Replacement component 50 is part of system 110 according to the present invention, and includes a barcode, a QR code, etc., as second identification means 52.

Figure 3:
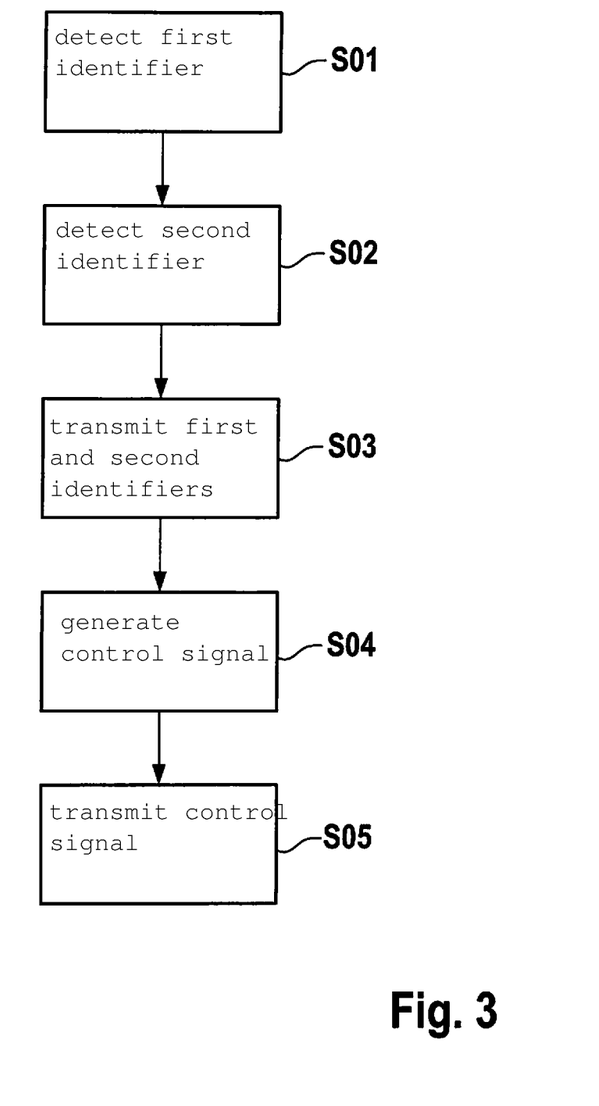
FIG. 3 shows a schematic flow chart for explaining a method for detecting at least one replacement component of a device according to yet another specific embodiment of the present invention.

FIG. 3 shows a schematic flow chart for explaining a method for detecting a replacement component 50 of a device 30; 130 according to yet another specific embodiment of the present invention. The method according to FIG. 3 is suitable in particular for being carried out with the aid of the system according to the present invention, preferably system 10 or system 110 according to the present invention, and is therefore adaptable according to all refinements and modifications described with regard to the system according to the present invention, in particular systems 10; 110, and vice versa.

A first identifier 81 of device 30; 130 with at least one replaceable component 40 is detected by a mobile terminal 60, in particular by an app running on mobile terminal 60; 160, in a step S01. The detection may include, for example, optical reading, detection of an RFID code, etc. A second identifier 82 of a replacement component 50 for replaceable component 40 of device 30; 130 is detected by mobile terminal 60; 160 in a step S02, for example as described for first identifier 81.

For this purpose, a first identification means 32 of a vehicle, for example, as a device 130, may initially be scanned with the aid of a camera of a mobile terminal 60; 160. An app running on mobile terminal 60; 160 reads out first identifier 81 from first identification means 32 and then queries second identification means 52 concerning at least one replacement component 50. Second identification means 52 is/are likewise scanned with the aid of the camera. This is continued until a user indicates that no further replacement components 50 are to be installed.

Optionally, as described above, additional parameters 84 may be detected, for example an identifier which unambiguously identifies the user of mobile terminal 60; 160, which may refer to a certified service facility, for example.

Detected first and second identifiers 81, 82 are transmitted to a computing device 20; 120, in particular by mobile terminal 60; 160, in a step S03. If additional parameters 84 have been detected, these may likewise be transmitted.

A control signal 83 is generated based on first and second identifiers 81, 82, in particular by computing device 20; 120, in a step S04. For this purpose, computing device 20; 120 or a program executed by computing device 20; 120 may check the consistency, plausibility, and/or correctness of the data record transmitted by mobile terminal 60: 160, for example with the aid of interface 122 of computing device 120 and access to at least one external database 70 or an internal database 124.

Generated control signal 83 is transmitted to device 30; 130, for example with the aid of wireless communication and/or the Internet and/or using mobile terminal 60; 160, in a step S05. Control signal 83 may include an authorization signal ("OK message"), for example. Control signal 83 may also control device 30; 130 to output an acknowledgement, for example by visual or voice output of the message "Replacement components: 1. . . . , 2. . . . successfully replaced," or by switching an indicator light 136 on or off. A communication connection between device 30; 130 and mobile terminal 60; 160 may be used for this purpose. Mobile terminal 60; 160 may be connected to device 30; 130, for example via Bluetooth or WLAN or also via cable. Alternatively or additionally, device 30; 130 may have its own interface for access to the Internet in order to be able to communicate directly with computing device 20; 120.

If, for example, a previously used replacement component 50, or a replacement component which does not meet the predetermined requirements and/or which is not listed in an external database 70 which is contacted by computing device 20; 120, is installed, computing device 20; 120 may provide control signal 83 as a warning signal and/or as a deactivation signal instead of as an authorization signal.

Device 30; 130 is controlled with the aid of control signal 83, in particular as described above for systems 10; 110, in a step S06. This means that control S06 of device 30; 130 may include in particular an activation (by an authorization signal) or a deactivation (by a deactivation signal) of device 30; 130 and/or of installed replacement component 50, an activation or deactivation (by a warning signal) of an indicator light 136 of device 130, and the like.

In addition or as an alternative to the activation or deactivation of indicator light 136, a further optical indication signal, an acoustic indication signal, for example a warning voice output, a haptic indication signal, or the like may be output.

Figure 4:
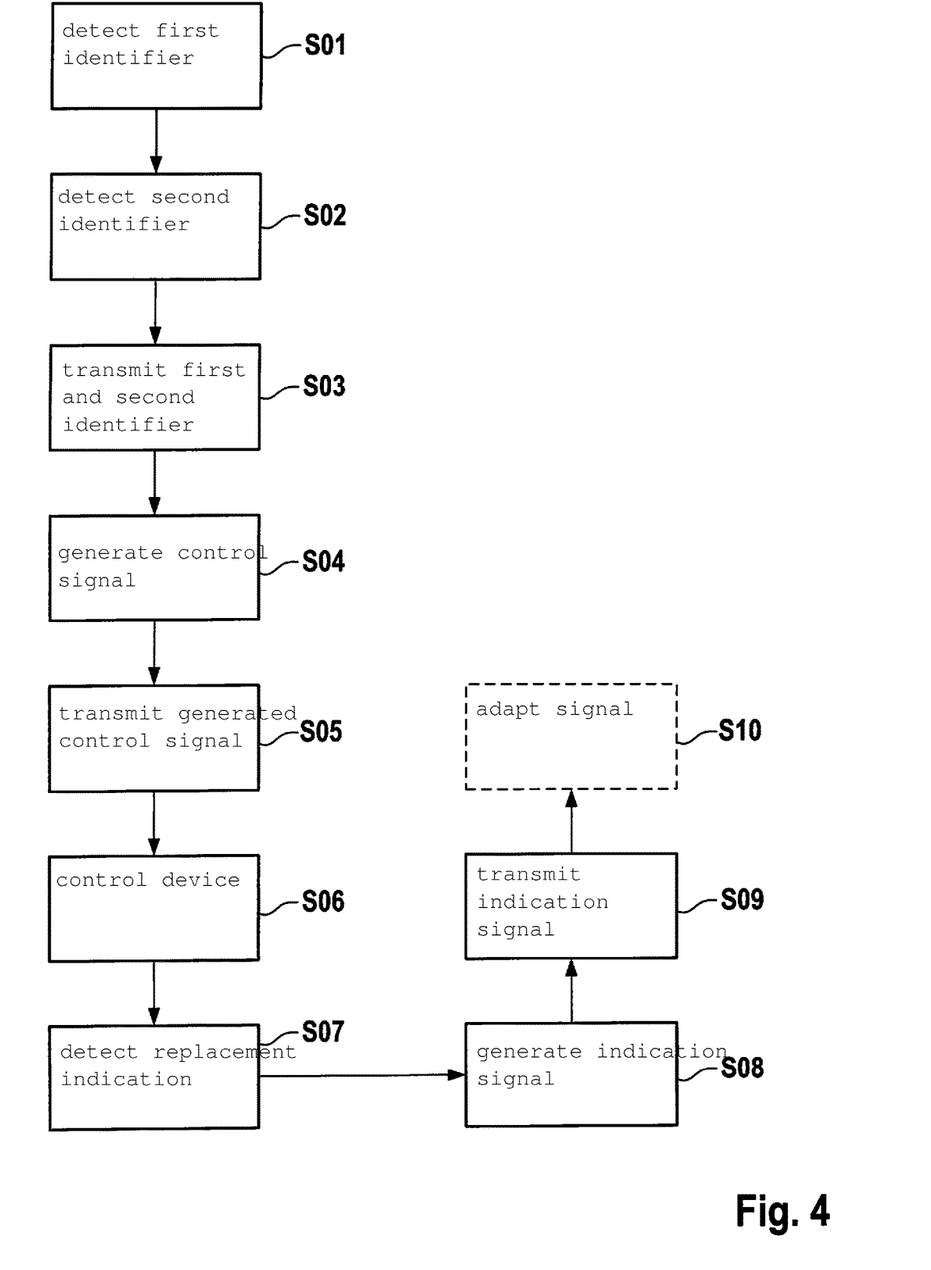
FIG. 4 shows a schematic flow chart for explaining a method for detecting at least one replacement component of a device according to yet another specific embodiment of the present invention.

FIG. 4 shows a schematic flow chart for explaining a method for detecting a replacement component 50 of device 30; 130 according to yet another specific embodiment of the present invention. The method according to FIG. 4 is a variant of the method according to FIG. 3.

In comparison to the method according to FIG. 3, the method according to FIG. 4 also includes the following steps: a replacement indication is detected in a step S07, for example as described for testing device 134 of system 110. A replacement indication may be understood to mean any distinctive feature which may indicate that a replacement component 50 has been installed. This may be the case, for example, when a replacement component 50 is installed in device 30; 130 without a second identification means 52 having been detected, i.e., without an associated second identifier 82 having been detected and transmitted. In this case, the instantaneous data record by way of example in the database of computing device 20; 120, as described above, does not correspond to the actual instantaneous configuration of device 30; 130.

To detect the replacement indication, an algorithm, for example (e.g., in a vehicle control system of a vehicle as device 30; 130), may monitor whether a predetermined pattern occurs during operation of 30; 130. Such an algorithm and/or such a predetermined pattern may also be transmitted by computing device 20; 120 to device 30; 130 via control signal 83.

If replacement component 50 is, for example, an installed impermissible filter in the low pressure circuit of a diesel engine, a replacement indication in the form of a longer starting period may be present. Namely, when the filter is replaced, air penetrates into the low pressure circuit. Ventilation of the low pressure circuit, which is thus made necessary, would increase a cranking time for building up a required pressure in the fuel rail during cranking of a starter motor. A replacement indication may thus be detected by monitoring the cranking time, combined with monitoring of a pressure signal of the high pressure circuit. It may be provided that a replacement indication is assessed as such only when it is checked for plausibility, or when it is detected concurrently with a predetermined number of further replacement indications.

A further replacement indication may result when a position of a cover switch for start-stop systems which indicates an open engine cover is detected. A further replacement indication may be present when a plurality of fairly short cranking times is detected within a predetermined time period without the engine successfully starting. A further replacement indication may be represented by an integrated cranking time within a predetermined time period with an unusually low pressure in the fuel rail.

The detected replacement indication may be stored in device 30; 130, for example a vehicle control system of device 30; 130, and transmitted to computing device 20; 120 as soon as a communication connection is present, for example via mobile terminal 60; 160.

An indication signal 85 is generated in a step S08 based on the ascertained replacement indication. It may be provided that indication signal 85 is generated only when at least a predetermined number of replacement indications or plausibility-checked replacement indications is generated. Generated indication signal 85 is transmitted to computing device 20; 120 in a step S09.

Control signal 83 generated by computing device 20; 120 based on indication signal 85 transmitted to computing device 20; 120 may be adapted, for example as described above for computing device 120 and testing device 134, in an optional step S10. The adaptation of control signal 83 may take place in particular when no second identifier 82 of a replacement component 50 has been transmitted to computing device 20; 120 at the point in time or in the temporal vicinity thereof that the replacement signal is detected.

Alternatively, generated indication signal 85 may set a virtual switch in computing device 120, which via first identifier 81 is associated with the particular individual device 130. It may be provided that computing device 120 does not adapt control signal 83 until there is a specified accumulation of indication signals 85 by the same device 130. The computing device may also be designed for carrying out a plausibility check of one or multiple received indication signals 85, and to transmit and/or adapt control signal 83 only when plausibility has been determined by the plausibility check.

What is claimed is:

1. A system for detecting at least one replacement component of a device, the system comprising:
    a computing device;
    a device of a vehicle, the device including at least one replaceable component;
    a first identification device which provides a first identifier for the device, the first identification device being mounted on the device, the first identifier identifying the device;
    a second identification device which provides a second identifier for a replacement component, the second identification device being mounted on the replacement component, the replacement component being suitable for replacing the replaceable component of the device, the second identifier identifying the replacement component; and
    a mobile terminal having an optical sensor with the aid of which the first identifier is readable, and with the aid of which the second identifier is readable, the mobile terminal being configured to transmit the first and second identifiers to the computing device,
    wherein the computing device is configured to generate a control signal indicating whether the replacement component identified by the second identifier meets at least one predetermined requirement for operating with the device identified by the first identifier, and to transmit the control signal to the device in order to control the device, and
    wherein the control signal, in response to the replacement component not meeting the at least one predetermined requirement, produces at least one of: a deactivation of the device, or a warning about the replacement component.

2. The system as recited in claim 1, wherein the computing device is designed to generate the control signal in such a way that the device is activated by the control signal.

3. The system as recited in claim 1, wherein the computing device includes an interface via which the computing device accesses an external database, the computing device is designed to check whether the external database contains entries in conjunction with at least one of the first and the second identifiers, and if so, which entries, and the computing device is designed for generating the control signal additionally based on the entries in the external database.

4. The system as recited in claim 1, wherein the mobile terminal a detection device to detect additional parameters; and the mobile terminal is designed to transmit the additional parameters to the computing device.

5. The system as recited in claim 4, wherein the additional parameters include at least one of: an instantaneous position of the mobile terminal, an instantaneous time, and a third identifier, and the third identifier indicates at least one of the mobile terminal, and a present user of the mobile terminal.

6. The system as recited in claim 1, wherein the device includes a testing device which is designed to ascertain a replacement indication for a replacement of the replaceable component, to generate an indication signal based on the detected replacement indication, and to transmit the generated indication signal to the computing device.

7. The system as recited in claim 1, further comprising: the replacement component which includes the second identification device.

8. A method for detecting a replacement component of a device, the method comprising:
    detecting a first identifier of a device of a vehicle using an optical sensor of a mobile terminal, the device including at least one replaceable component, the first identifier identifying the device;
    detecting a second identifier of at least one replacement component, using the optical sensor of the mobile terminal, the second identifier identifying the replacement component;
    transmitting the detected first and second identifiers to a computing device;
    generating, by the computing device, a control signal indicating whether the replacement component identified by the second identifier meets at least one predetermined requirement for operating with the device identified by the first identifier;
    transmitting, by the computing device, the generated control signal to the device; and
    controlling the device with the aid of the control signal, wherein the control signal, in response to the replacement component not meeting the at least one predetermined requirement, produces at least one of: a deactivation of the device, or a warning about the replacement component.

9. The method as recited in claim 8, further comprising:
ascertaining a replacement indication for an occurred replacement of the replaceable component of the device;
generating an indication signal based on the ascertained replacement indication; and
transmitting the generated indication signal to the computing device.

10. The system as recited in claim 1, wherein the replaceable component is a filter.

11. The system as recited in claim 1, wherein the second identifier includes a graphical code.

12. The system as recited in claim 1, wherein the deactivation includes an interruption of a power supply to the device.

13. The system as recited in claim 1, wherein the deactivation includes at least one of: preventing a switching on of an ignition of the vehicle, or preventing a switching on of an engine of the vehicle.

14. The system as recited in claim 1, wherein the deactivation includes switching off one or more functions of the vehicle.

15. The system as recited in claim 6, wherein detecting the replacement indication includes monitoring for a predetermined pattern of operation of the vehicle.

16. The system as recited in claim 6, wherein the replacement indication includes at least one of: a length of a cranking time of an engine, a pressure of the engine, a position of a cover switch of the vehicle, or a number of crankings of the engine within a predetermined time period.

17. The system as recited in claim 1, wherein the predetermined requirement includes at least one of: a regulatory requirement, a functionality requirement, or a tolerance requirement.

\* \* \* \* \*